RADIX CONVERTER

Filed Nov. 12, 1954 2 Sheets-Sheet 1

Inventors:
George W. Hobbs,
Alfred B. Levine,
by Claude A. Mott
Their Attorney.

Oct. 6, 1959 G. W. HOBBS ET AL 2,907,525

RADIX CONVERTER

Filed Nov. 12, 1954 2 Sheets-Sheet 2

Inventors:
George W. Hobbs,
Alfred B. Levine,
by Claude V. Mott
Their Attorney.

United States Patent Office 2,907,525

Patented Oct. 6, 1959

2,907,525

RADIX CONVERTER

George W. Hobbs, Scotia, and Alfred B. Levine, Albany, N.Y., assignors to General Electric Company, a corporation of New York Application November 12, 1954, Serial No. 468,252

15 Claims. (Cl. 235—155)

Figure 1:
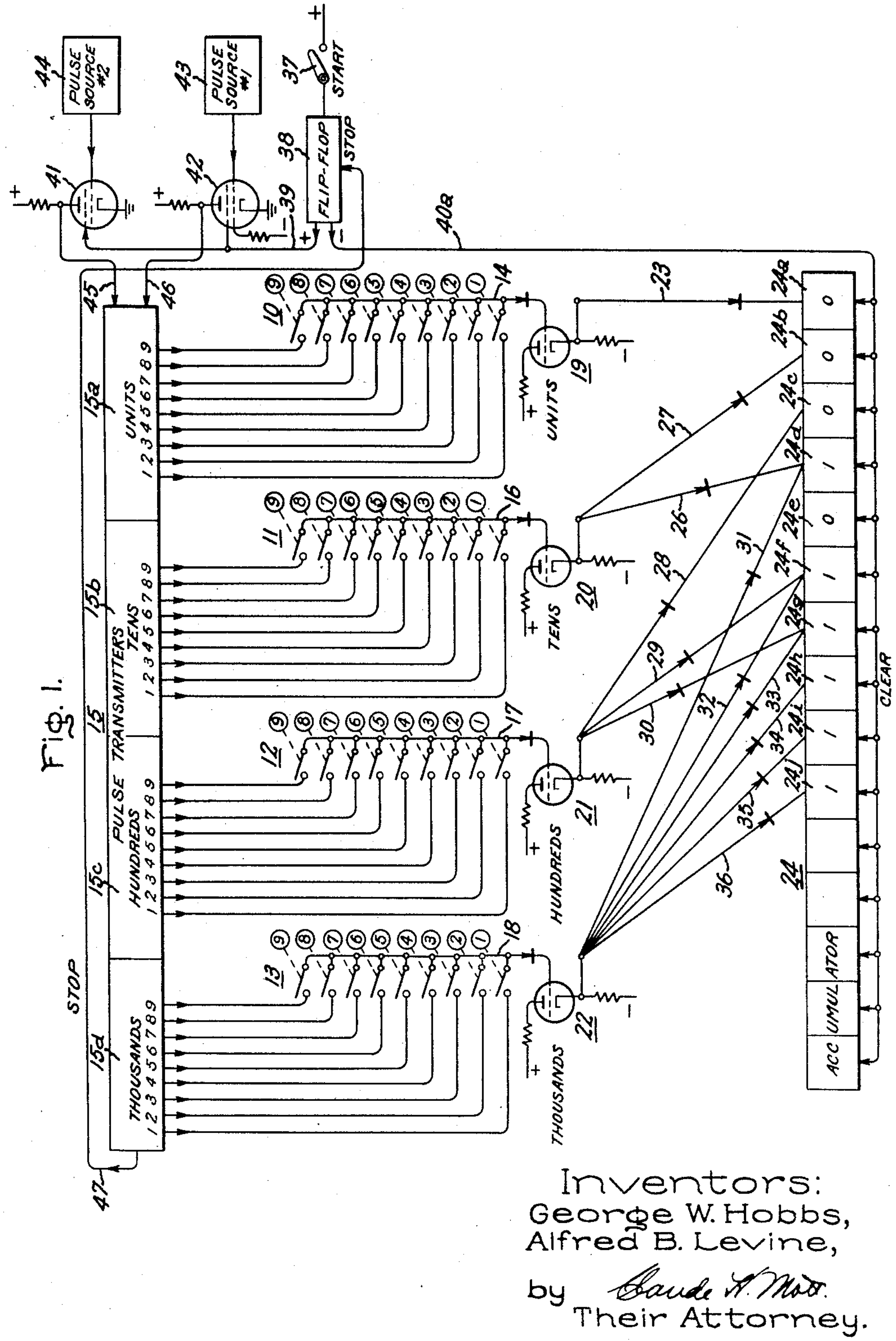

This invention generally relates to electronic digital calculating devices and more particularly to the portions of such devices for converting a number expressed in one radix to that in another, such as decimal-to-binary number converters.

Digital calculations in the binary or other radix system afford many advantages and simplifications over calculations in the decimal systems. However, the binary system, for example, employs more than three times as many digits as the decimal system and in addition is less familiar to human operators and, hence, more difficult to work with. For these reasons, it has become customary to perform calculations in the binary system but to incorporate means for receiving the input information from an operator in decimal form and to convert or translate this information into binary form within the calculator itself prior to performing the calculating functions. Such means have been termed by those skilled in the art as radix converters and, where the numbered data in decimal form is converted into binary form, as decimal-to-binary converters. Similarly, it is desirable to have the results of calculations made by a computing machine operating in the binary number system reconverted or translated to the human operator in decimal number form. For this purpose, a radix converter operating in the reverse direction and termed a binary-to-decimal converter is generally employed.

One such converter for translating a binary number into its decimal form is shown in copending application Serial No. 339,283, filed December 21, 1953, now Patent No. 2,860,831, whereas one such converter for translating a decimal number into binary form is shown in copending application Serial No. 415,286, filed March 10, 1954.

The present invention provides such a converter for translating a number expressed in one radix to that of another, and although it is disclosed hereinafter as a system for converting a number initially expressed in decimal form to binary form, it is apparent that the basic features of this invention may be employed to translate a number in any given radix to that of a second radix, both automatically and substantially instantaneously.

In accordance with this preferred embodiment of the invention, a plurality of number generating means are provided, one for each order of the decimal number to be converted, and each adapted to generate the binary form of a different order tens integral number, i.e. 10, 100, 1,000, 10,000, etc. A timing and programming circuit energizes each of these generators in sequence, with each generator being repeatedly energized, in turn, a number of times corresponding to the decimal digit of that order to be converted. For example, assuming the decimal number is 528, the lowest order or units generator is energized eight times, the tens generator two times, and the hundreds generator five times. All of the resulting binary signals produced by these generating means are then summed in a suitable accumulator or the like, and the resulting summation after the completion of all operations yields the binary form of the original decimally represented number.

It is accordingly one object of this invention to provide a high speed device for converting a number expressed in radix 10 to radix 2.

A further object is to provide a high speed digitally operating decimal-to-binary converter having no moving parts.

A still further object is to provide an improved device for translating a number expressed in one radix to that of another.

Figure 2:
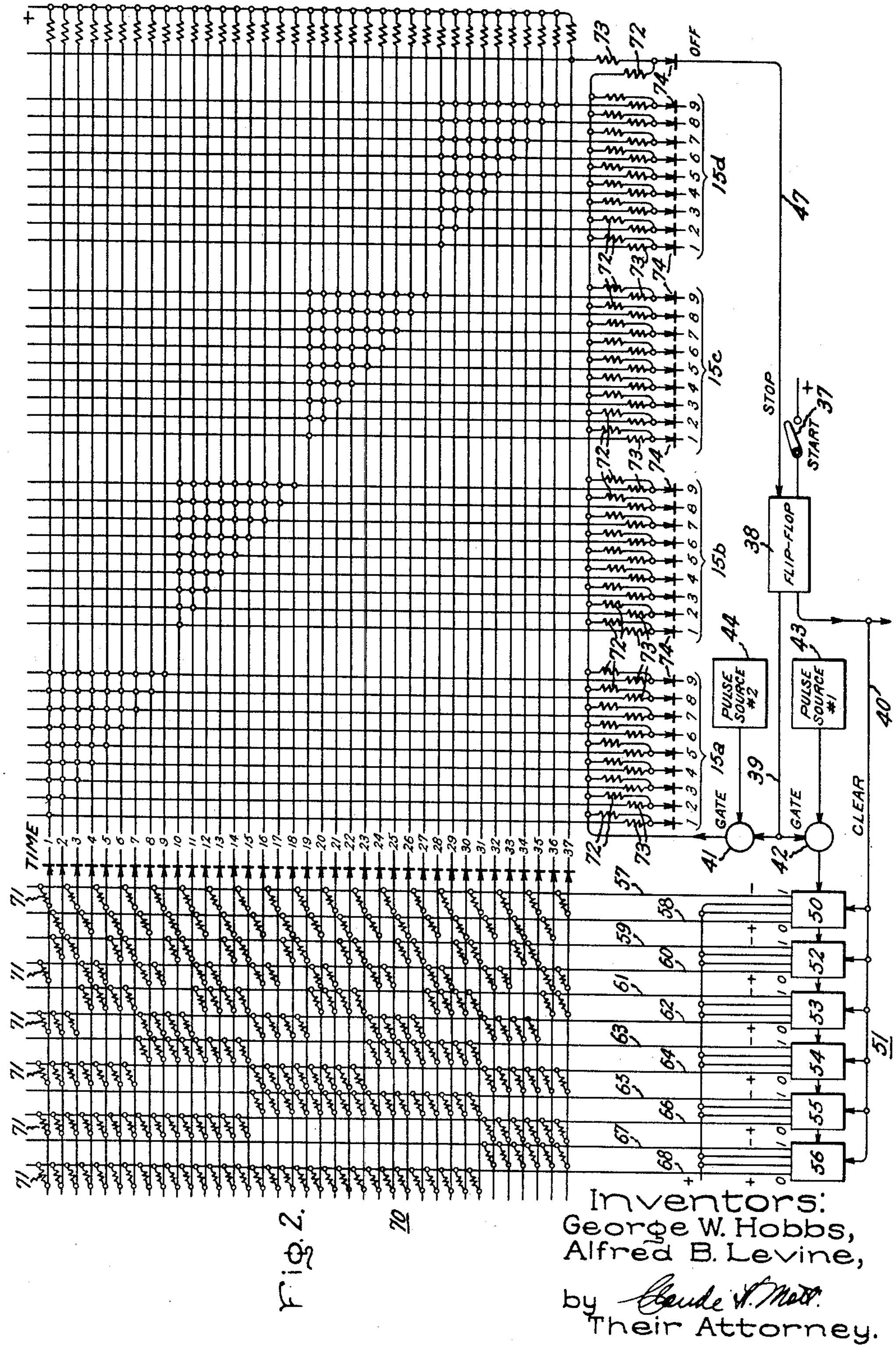

Other objects and many attendant advantages of this invention will be more readily comprehended by those skilled in this art upon a consideration of one preferred embodiment of the invention taken in conjunction with the accompanying drawings wherein:

Fig. 1 depicts the circuitry of one preferred embodiment of the invention, partially in block diagram form, and Fig. 2 illustrates preferred circuitry for the pulse generator and control circuit shown in Fig. 1.

Prior to commencing a detailed description of one preferred embodiment of the present invention, a more thorough comprehension thereof may be had by initially considering the mathematical basis for the operations performed. Considering that any four digit decimal number, such as 5285, may be represented as the sum of:

$$5000+200+80+5$$

or as the sum of the products obtained by multiplying the highest order decimal number 5, by 1,000; the next highest order decimal number 2, by 100; and the remaining decimal numbers 8 and 5 by 10 and 1, respectively, or:

$$5(1000)+2(100)+8(10)+5(1)$$

Then to convert this decimal number to binary form knowing the binary equivalent of the various tens integral numbers, as follows:

| Decimal: | Binary |
|---|---|
| 1 | 0000000001 |
| 10 | 0000001010 |
| 100 | 0001100100 |
| 1000 | 1111101000 |

may be simply performed by adding the binary equivalent of 1,000 a total of five times; and to this summation adding the binary equivalent of 100 a total of two times, and to this resulting latter number adding the binary equivalent of 10 a total of eight times, and finally adding the binary equivalent of 1 a total of five times.

Then considering that any four digit decimal number may be simply represented as:

$$a(1000)+b(100)+c(10)+d(1)$$

Where each of the letters $a$, $b$, $c$ and $d$ may be any decimal number from 0–9, it is apparent that any decimal number may be converted into its binary form by adding binary 1,000 a total of $a$ times, plus adding binary 100 a total of $b$ times, plus adding binary 10 a total of $c$ times, and finally adding binary 1 a total of $d$ times.

Referring now to Fig. 1 for an understanding of one preferred apparatus operating in accordance with this system and being illustrated for simplicity as a decimal-to-binary converter for translating any four place decimal number to its binary form, the four place or four digit decimal number is initially entered into a keyboard, memory circuit, or the like, by depressing the appropriately numbered key in each of the units bank of keys generally designated 10, a tens bank of keys generally designated 11, a hundreds bank of keys generally designated 12, and a thousands bank of keys generally designated 13. The nine keys in each bank, numbered 1–9 inclusive, are each connected to operate a different one of nine separate switches, as shown, having one terminal of each of the switches connected in common and the other terminals connected to a different one of nine input lines leading therein. Depressing any one of these keys, therefore, selectively connects the desired one of said nine input lines with the common output line leading from that bank of switches.

Considering the units bank 10, for example, each of the nine numbered keys is connected to a separate switch having one terminal thereof connected in common to an electrical line 14 and having the other terminals thereof separately connected to a different one of nine input lines. Similarly, the tens bank of switches 11 selectively interconnects any one of the nine separate lines leading therein to a common output line 16; the hundreds bank of switches 12 selectively connects any one of nine separate lines leading therein to a common line 17; and finally the thousands bank of switches 13 selectively connects any one of nine lines leading therein to a common line 18.

The common lines 14, 16, 17 and 18 leading from the switch banks 10, 11, 12 and 13, respectively, are each connected to energize a different one of four number generators; the units generator 19, the tens generator 20, the hundreds generator 21, and the thousands generator 22. Each of these generators preferably comprises a cathode-follower type circuit including a triode electron tube having its plate element energized by a positive voltage supply through a resistor, its cathode element energized by negative voltage through a resistor, and its control grid adapted to receive impulses from the given bank of switches through a rectifier and to transmit such impulses from its cathode, as is common to this type of circuit.

For summing the impulses from the units number generator 19, a single electrical connection is made from its cathode element to the input of the first stage **24*a* of an accumulator 24. For each impulse transmitted by units number generator 19, therefore, the binary number one is added into the accumulator. The tens number generator 20, on the other hand, is provided with two output lines 26 and 27, and therefore transmits pulses simultaneously over both lines to the inputs of the second and fourth stages 24*b* and 24*d* of accumulator 24, resulting in the binary equivalent of the decimal 10 or (1010) being entered into the accumulator for each energization thereof. Hundreds number generator 21, being provided with three output lines 28, 29, and 30, simultaneously energizes the accumulator third, sixth, and seventh stages 24*c*, 24*f*, and 24*g*, respectively, whereby for each energization of this generator, the binary equivalent of 100 or (1100100) is entered into the accumulator. Finally, the thousands generator 22, being provided with six output lines 31–36 inclusive, simultaneously energizes the accumulator fourth, sixth, seventh, eighth, ninth, and tenth stages 24*d*, 24*f*, 24*g*, 24*h*, 24*i*, and 24*j*** respectively, resulting in the binary equivalent of 1,000 or (1111101000) being entered into the accumulator for each energization thereof.

Thus, it is observed that each of the number generators is adapted to transmit a series of impulses representing the binary equivalent of a different order tens integral number into the accumulator for each energization thereof. Stated more generically, there are provided a plurality of number generators 19, 20, 21, and 22, one for each order or power of the first radix (which is the decimal radix or ten in this instance, and a generator 19 is provided for the first order $10^0$, a generator 20 for the second order $10^1$, a generator 21 for the third order $10^2$, and a generator 22 for the fourth order $10^3$). Impulses from each number generator are directed or conveyed to preselected stages of a multistage accumulator having one stage for each order of the second radix (which is the binary radix or two in this instance, and the first stage

**24*a* is provided for the first order $2^0$, the second stage 24*b*** for the second order $2^1$, etc.) with the result that as each number generator is energized, a number corresponding to that order of the first radix (decimal) is entered into the accumulator in the form of the second radix (binary).

For repetitively energizing each of these number generators in accordance with the desired decimal digit of that order to be converted, a plurality of pulse transmitters **15*a* through 15*d* are provided, one for each of the units bank, tens bank, hundreds bank, and thousands bank. Each pulse transmitter has nine output lines, numbered 1–9 inclusive, with each line adapted to transmit a number of impulses corresponding to its number designation. For example, line 1 of the units pulse transmitter 15*a* is adapted to generate one pulse, line 2 is adapted to generate two pulses in time sequence, line 3 three pulses in sequence, etc. Each of these numbered lines is connected to a similarly numbered terminal of the switches of that bank. Thus, for example, if the switch operated by key 2 of the units key 10 is depressed, two pulses are directed downwardly over line 2 of pulse transmitter 15*a* through the switch operated by key 2, and thence downwardly over line 14 and through the rectifier to the control grid of the units number generator 19. After being conveyed to this cathode follower circuit, these two impulses emerge from the cathode of this tube and pass downwardly over line 23, entering stage 24*a* of accumulator 24 and adding binary 2 into the accumulator. Taking a second example, if key 4 in the tens order bank 11 is depressed, four impulses are directed downwardly over line numbered 4 of pulse transmitter 15*b* and, after passing through the closed switch operated by key 4, travel downwardly through rectifier and line 16 to the control grid of tens number generator 20. After passing through the tens number generator 20, each of these four impulses is simultaneously directed both over lines 26 and 27 leading from the cathode thereof, to enter stages 24*b* and 24*d* of accumulator 24**, entering the binary equivalent of decimal number 10 (or 1010) into the accumulator a total of four times. Tracing through each of these banks of switches in this manner, it is observed that by depressing the appropriately numbered keys in each of the banks, any four-digit decimal number may be converted into its binary form.

To prevent interference in the accumulator stages between impulses simultaneously emitted from the different number generators, and to prevent interaction resulting from accumulator carry-over pulses interfering with the entry of pulses into one or the other of these accumulator stages, the present invention preferably programs the pulse transmitters **15*a*—15*d* to operate in sequence. Impulses emitted from the tens pulse transmitter 15*b*, therefore, do not commence until after the impulses emitted from the units pulse transmitter 15*a* have been completed. Similarly, the hundreds transmitter 15*c* and the thousands transmitter 15*d* are restrained until after the tens transmitter 15*b* and the hundreds transmitter 15*c***, respectively, have completed their sequence of impulses.

The remaining portions of the system shown at the upper right-hand section of Fig. 1 generally comprise the programming and control circuitry for automatically starting and stopping the operation of the impulse transmitter, and for clearing the stages of accumulator 24 upon the completion of all operations. For starting this conversion operation, a means such as a start switch 37, relay, or the like closes a circuit energizing a double stability state or flip-flop control circuit 38 with a positive impulse. Energizing this control circuit 38 switches its conducting condition and provides a more positive potential on line 39 leading therefrom, and a more negative potential on line **40*a* leading therefrom. This positive potential is directed upwardly to the screen control grids of gate tubes 41 and 42, opening these gates and allowing two continuous series of impulses from the two pulse sources, generally designated 43 and 44, to pass to the control grids of these gate tubes and thence through the plate circuits of these tubes to the inputs of pulse transmitters 15***a*—15*d* over lines 45 and 46. These two continuous series of impulses thereafter operate each of said pulse transmitters 15*a*—15*d*, in sequence to enable each transmitter to emit the nine different series of impulses over the nine different output lines leading therefrom. Upon completion of all of these operations, a stop pulse being generated by the thousands transmitter 15*d* over line 47 is directed backwardly to a second input of control flip-flop circuit 38, reversing the conducting condition thereof, and a more negative potential is transmitted over line 39 and a more positive potential over line 40*a*. The more negative potential over line 39 closes gates 41 and 42 preventing the impulses from pulse sources 43 and 44 from further energizing the pulse transmitters 15*a*—15*d*. The more positive potential over line 40*a* is directed downwardly to the accumulator clear circuit, and is injected into each of the stages 24*a*–24*j*, inclusive, of the accumulator 24 to return each stage to its zero or non-conducting condition, and to transfer the number therein to a storage register or the like (not shown) as illustrated in application Serial Number 415,-286 referred to above. Upon the accumulator being cleared of its binary number, this system is then conditioned for a new series of operations, which may be commenced by entering a new decimal number into the keyboard of the system and thereafter depressing start key 37 to commence the conversion of this new decimal number to its binary form by the sequence of operations discussed above.

*Pulse generators and timing circuit*

Referring now to Fig. 2 for an understanding of the preferred circuitry for the pulse transmitters 15*a*—15*d* inclusive, and of the programming circuitry. After start switch 37 has been closed, as discussed above, pulse source 43 in the lower portion of the figure propagates a continuous supply of recurring pulses through electrical gating member 42, to enter the input stage 50 of a frequency divider circuit, generally designated 51. Frequency divider 51, being preferably comprised of a plurality of cascaded binary flip-flop stages 50, 52, 53, 54, 55, and 56, provides the means for receiving each of these incoming pulses from source 43, and separating each of these incoming pulses into a different code of potentials on the output line 57–68 inclusive thereof, leading upwardly from these flip-flop stages. These coded potentials are thence directed to energize the twelve vertical input lines leading into the programming matrix generally designated 70, resulting in the thirty-seven horizontal output lines thereof, numbered 1–37 inclusive, being consecutively energized one at a time, in response to each succeeding impulse entering the input stage 50 of the frequency divider 51.

For example, prior to receiving the first impulse from source 43, all of the divider stages 50, 52, 53, 54, 55, and 56 have their left-hand output lines in a more positive potential than their right-hand output lines; that is, line 58 is more positive than line 57, line 60 more positive than line 59, line 62 more positive than 61, line 64 more positive than 63, line 66 more positive than 65, and line 68 more positive than 67. Following the connections of these vertical output lines through the matrix 70, it is observed that none of the horizontal output lines of the matrix is connected through resistors 71 to all of the more positive output lines of the frequency divider. Upon receiving the first impulse from source 43, the output lines of stage 50 reverse their conducting condition, making line 57 then become more positive than line 58. Since all of the remaining stages do not change their conducting condition, tracing these output lines 57—68 again upwardly through the matrix, it is observed that in this instance only, the uppermost horizontal line of the matrix, numbered line 1, is connected to all the more positive lines, whereas every other horizontal line of the matrix 70 is connected to at least one of the more negative lines leading from the frequency divider stages. Consequently, only output line 1 is rendered positive upon receiving the first impulse from source 43. Upon receiving the second impulse from pulse source 43, the first flip-flop stage 50 of frequency divider 51 again reverses its conducting condition, resulting in output line 58 becoming more positive than line 57 and transmitting a carry-over impulse to the next flip-flop stage 52. This carry-over pulse reverses the conducting condition of the second flip-flop stage 52, making output line 59 thereof more positive than output line 60. Following the connections of all of the vertical lines again upwardly through the matrix, it is observed that after receiving this second impulse, only the second uppermost horizontal line, Time 2, is now connected to all six positive lines leading from frequency divider 51. Consequently, matrix output line Time 2 may be considered as being energized by the second input pulse from source 43. In this manner, following the vertical line connections from frequency divider 70 through the matrix to the horizontal output lines thereof for each succeeding impulse, it is observed that for each succeeding impulse transmitted by source 43, the next numbered output line of matrix 70 is energized by a more positive potential, and therefore this combination of the frequency divider 51 and matrix 70 in effect diverts each pulse from pulse source 43 over a different output line of matrix 70, resulting in each succeeding output line thereof being energized in time succession by the pulses from source 43.

Having these 37 separate output lines individually energized at succeeding time intervals, any desired time sequence of pulses may be readily taken from matrix 70 by merely connecting common output lines to bridge any series of these horizontal matrix lines. For example, the units pulse generator 15*a* is provided with nine output lines, with each one of these nine lines being adapted to generate a different sequence of one to nine impulses. Referring to Fig. 2, it is observed that the first vertical line, numbered line 1 of bank 15*a*, is connected to the uppermost horizontal line of matrix 70, numbered Time 1. Thus, the first output line of the units pulse generator is positively energized by the first impulse from source 43 passing through the frequency divider circuitry 51 and the matrix 70. Similarly, the second output line of unit pulse generator 15*a*, numbered line 2, is connected to bridge both the first and second horizontal output lines of matrix 70, and is therefore positively energized by both the first and second impulses from source 43; and the third output line of unit pulse generator, numbered line 3, is connected to bridge the first three horizontal output lines of matrix 70, etc. Thus, by means of these connections, each of these lines is adapted to transmit a different number of impulses from 1–9 in time sequence, corresponding to the numbered designation of the line, in response to succeeding impulses from source 43.

It will, of course, be readily appreciated by those skilled in the art that the horizontal lines leading from matrix 70 are not directly connected to the various vertical output lines of the pulse generator banks, 15*a*—15*d*, but rather each connection is preferably made through a rectifier, diode or other one-way element (not shown) to prevent spurious energization of these lines. For example, considering the first bank 15*a*, it is noted that the second horizontal line of matrix 70 is connected to vertical lines 2–9, inclusive, of bank 15*a*, but not connected to vertical line 1 of 15*a* because as discussed above it is desired that vertical line 1 transmit only one impulse at Time 1. However, if all of these connections were not made through rectifier or other isolating devices, line 1 would be spuriously energized at Times 2–9, inclusive, through a feedback connection by reason of its connection to output line 1 of matrix 70. Hence, by making all connection from the matrix horizontal lines to the vertical output lines of the various banks through rectifiers or the like, such spurious energization is prevented since each of the vertical lines of all of the banks 15a—15d are electrically isolated.

Considering the tens order pulse generator 15b, it is noted that the first vertical line thereof, numbered line 1, is connected to the tenth horizontal output line of matrix 70. Thus, after each of the lines of the units pulse generator bank 15a has completed its series of 1–9 impulses, energization of the tens pulse generator lines is commenced in the same manner with the tenth pulse passing through lines 1–9 of the tens bank 15b; the eleventh impulses passing through lines 2–9; the twelfth pulse passing through lines 3–9, etc. Similarly, after completion of the nine sequence of pulses by the tens pulse generator bank 15b, the first line of the hundreds pulse generator 15c, being connected to the nineteenth horizontal output line of matrix 70, receives its first energization. Thus, each of these banks of pulse generators is adapted to transmit nine sequences of pulses over the nine separate output lines thereof, in order, the units pulse generator completing its cycle of operation prior to the energization of the tens order bank 15b, the hundreds order bank 15c commencing its cycle of operations upon the completion of operations by the tens order bank, etc.

For providing sharp edged pulses over the output lines of these pulse generators, time displaced pulses from the second pulse source 44 are preferably coincidentally combined with the matrix output pulses by directing these secondary pulses through gate 41 and summing impedances 72. Each of these summing impedances 72 is connected in a summing circuit with impedances 73, which in turn are individually energized by the potentials leading from the matrix output lines. Hence, when the potentials across the given ones of the impedances 73 are sufficiently positive, a coincidentally received impulse from source 44 being directed to the corresponding summing impedance 72 is combined with this more positive potential and permitted to pass through the associated biased rectifying element 74 to the desired output line of the pulse transmitter.

After all of these pulse transmitters have been operated, a stop pulse is transmitted over matrix horizontal line 37 and is propagated through one-way diode or rectifier 74 to stop line 47. This pulse is then directed over this stop line 47 to the input of control flip-flop 38, reversing its conducting condition and placing a more positive potential on output line 40 thereof and a more negative potential on output line 39 thereof. The more negative potential on output line 39 closes gates 41 and 42, thereby preventing the impulses from pulse sources 43 and 44 from passing into the programming and timing circuitry. The more positive potential over output line 40 of flip-flop 38 is directed downwardly over clear line 40 to energize all the stages of the frequency divider circuit 51 in common, clearing all of these stages to their zero or initial conducting condition. This more positive potential is also directed downwardly (as shown in Fig. 1) over line 40a to simultaneously clear all of the stages of accumulator 24, thereby returning all of these accumulator stages to their zero condition and resetting the accumulator for a new series of operations. As is well known in the art, the binary number standing in accumulator 24 may be cleared to either a storage register or transferred to another portion of the computing device for further operations.

In summary, the preferred embodiment of the pulse generator circuitry employed in the present invention preferably comprises a frequency divider circuit 51, including a plurality of cascaded scale-of-two dividing stages, provided as a means for separating each of the incoming pulses received from a common recurring pulse source and directing a coded potential over a plurality of output lines representative of each pulse. This coded potential is then directed to a programming matrix 70 and conditions this matrix for generating the desired sequence of time displaced pulses over a plurality of output lines which are employed to energize the various number generators 19–22 inclusive.

The circuitry for the remaining portions of the system, including the accumulator 24 and the stages of the frequency divider 51, along with the control flip-flop circuit 38, has not been shown in detail, since all of these circuits may be generally comprised of the basic Eccles-Jordan binary counting circuit that is well known in the art, each stage thereof being comprised of two vacuum tubes or the like, interconnected in feedback in a double-stability state circuit and adapted to count two impulses and, after receiving the second consecutive pulse, to generate a carry-over pulse to the next succeeding stage. Further details of this circuit, both as an accumulator, frequency divider, or control circuit, are fully shown and described in copending application Serial No. 415,286, filed March 10, 1954.

Although for purposes of simplicity the above preferred embodiment of the invention has been disclosed as a decimal-to-binary converting system, for translating a relatively small decimal number to its binary form, this invention, of course, is not limited to any particular radix conversion, nor to any particular range of numbers; for, by the addition of more stages to accumulator 24, more number generators, and a larger capacity frequency divider 51 and matrix 70, it is obvious that many infinitely larger decimal numbers can be readily and substantially instantaneously converted to binary form. Moreover, it is obvious that the invention is applicable to converting a number expressed in any one radix to that of another.

Furthermore, many variations to the preferred circuitry illustrated and described may be readily made by those skilled in the art, in accordance with the basic invention herein disclosed, without departing from the spirit and scope of this invention, and therefore this invention is to be considered as limited only in accordance with the features thereof as set forth in the claims appended hereto.

What is claimed as new and desired to be secured by United States Letters Patent is:

1. In a radix converter for translating a number expressed in radix X into a number expressed in radix Y, a plurality of number generators, one for each power of radix X, each generator including a number of output lines corresponding to the number of powers of radix Y which need be summed to numerically equal the value of that power of radix X, a multi-stage accumulator having one stage corresponding to each power of radix Y and each of said stages adapted to complete its cycle of operations upon receiving a number of impulses corresponding to one less than the number radix Y, and thence to carry over an impulse to the next succeeding stage, means connecting the output lines from each number generator to selected accumulator stages such that, for each energization of a number generator, impulses corresponding to that power of radix X are entered into the accumulator in the form of radix Y, and means for repetitively energizing each of said number generators in accordance with the digit associated with that power of radix X.

2. In a converter for translating a number expressed in one radix to that of a second radix, a plurality of impulse transmitters, one for each order of the number when expressed in the first radix, each transmitter having a plurality of output lines corresponding in number to one less than the first radix with each of said lines adapted to transmit a different number of impulses equal to a different digit of said first radix, a plurality of order networks, one for each of said impulse transmitters, and each having an input line and a plurality of output lines and being adapted to simultaneously transmit over said output lines impulses representing the second radix form of a different order of the first radix, a summing device for receiving the impulses from all of said networks, means selectively interconnecting any one of the output lines of each impulse transmitter with the input line of the corresponding order network in accordance with the digit of that order to be translated, and means for sequentially energizing each of said impulse transmitters in turn.

3. In a radix converter for translating a number expressed in radix X into the same number expressed in radix Y, a plurality of impulse transmitters, one for each power of the first radix X, each transmitter having a plurality of output lines corresponding in number to one less than the radix X, with each of said lines adapted to transmit a different number of impulses equal to a different digit of radix X, a plurality of order networks, one for each of said impulse transmitters and each having an input line and a plurality of output lines, and being adapted to simultaneously transmit over said output lines an impulse for each power of radix Y contained in that power of radix X, a summing device for receiving the impulses from all of said networks, means selectively interconnecting any one of the output lines of each impulse transmitter with the input line of the corresponding order network corresponding to the digit of that order of radix X to be translated, and means for sequentially energizing each of said impulse transmitters in turn.

4. A decimal-to-binary converter comprising an accumulator having a plurality of cascaded stages, each of which completes its cycle of operations in two steps and each having separate inputs for enabling both the simultaneous entry of a complete number in binary notation and the simultaneous addition thereto of other binary notations, a plurality of number generators, each said generator including a plurality of output lines connected into selected accumulator stages for entering the binary equivalent of a different order of the multi-order decimal number into the stages of said accumulator in additive relation with the number stored therein, means for sequentially energizing said number generators in turn with each generator performing a number of operations corresponding to the decimal digit of that order to be converted, and means actuated after the completion of operations of the last number generator for disabling said energizing means.

5. In a decimal-to-binary converter a plurality of impulse transmitters, one for each order of the decimal number to be converted, each transmitter having nine output lines with each of said lines adapted to transmit a different sequence of one to nine impulses, a plurality of order networks, one for each of said impulse transmitters and each having an input line and a plurality of output lines and being adapted to simultaneously transmit over said output lines impulses representing the binary coded form of a different decimal order, a summing device for receiving and accumulating the impulses from all of said networks, means selectively interconnecting any one of the nine output lines of each order transmitter with the input line of the corresponding order network in accordance with the decimal digit of that order to be translated, and means for sequentially energizing each of said impulse transmitters in turn.

6. In a converter for translating a number expressed in one radix to that of a second radix, a summing accumulator having a plurality of cascaded stages, one for each power of the second radix, a plurality of networks, one for each power of the first radix with each network being interconnected with preselected different ones of said stages and adapted to transmit impulses to said preselected stages for translating each power of the first radix into the various power of the second radix having a sum equal thereto, and means for repetitively energizing each of said networks a number of times corresponding to the first radix digit of that power to be translated, whereby the resulting sum in said accumulator after all energizations have been completed equals the second radix form of said number.

7. In a converter for translating a number expressed in one radix to that of a second radix, an accumulator having a plurality of cascaded stages, one for each power of the second radix, a plurality of networks, one for each power of the first radix with each network being interconnected with preselected different ones of said stages and adapted to transmit impulses to said preselected stages for translating each power of the first radix into a sum of powers of the second radix equal thereto, and means for repetitively energizing each of said networks in sequence, with each network being energized a number of times corresponding to the first radix digit of that power to be translated, whereby the resulting reading of said accumulator after all energizations have been completed equals the second radix form of said number.

8. In a converter for translating a number expressed in one radix to that of a second radix, an accumulator having a plurality of cascaded stages, one for each power of the second radix, a plurality of transmitting means, one for each power of the first radix with each transmitting means adapted to simultaneously transmit impulses into preselected ones of said accumulator stages for each energization thereof for translating each power of the first radix into a sum of powers of the second radix equal thereto, and means for repetitively energizing each of said transmitting means in turn with each transmitting means being energized a number of instances corresponding to the digit of the first radix associated therewith, whereby the resulting reading of said accumulator after all energizations have been completed equals the second radix form of said number.

9. In a converter for translating a number expressed in one radix to that of a second radix, an accumulator having a plurality of cascaded stages, one for each power of the second radix, a plurality of networks, one for each power of the first radix to be translated with each network being interconnected with preselected different ones of said stages for translating each power of the first radix into the same number expressed in powers of the second radix, means for repetitively energizing the lowest power network a number of instances corresponding to the lowest order digit of the number in the first radix, said means operative after said lowest order energizations have been completed for energizing said second power network a number of instances corresponding to the second order digit of the number in the first radix, and said means being further operative after said second power energizations have been completed for repetitively energizing said third highest power network and thereafter said remaining power networks, each in turn, with each of said networks being energized a number of times corresponding to the digit of the number to be translated associated therewith, whereby the resulting reading of said accumulator after all energizations have been completed equals the second radix form of said number.

10. In a converter for translating a given number expressed in a higher base number to a lower base number, an accumulator having a plurality of cascaded stages, one for each integral power of the lower base number, a plurality of transmitting means, one for each integral power of the higher base with each transmitting means being interconnected with preselected ones of said stages and adapted to transmit impulses to said preselected stages for translating said power of the first base into a sum of powers of the second base equal thereto, and means for repetitively energizing each of said transmitting means in sequence with each transmitting means being energized a number of instances corresponding to a different digit of the number expressed in said higher base number.

11. In a decimal to binary radix converter, a binary accumulator having a plurality of cascaded binary stages one for each power of the binary base 2, a plurality of networks one for each power of the decimal base 10 with each network being interconnected with preselected ones of said stages and adapted to transmit input impulses thereto to enter the binary equivalent of that power of base 10 therein, and means for repetitively energizing each of said networks a number of times corresponding to the decimal digit of that power to be converted, whereby the resulting binary number standing in said accumulator after all said energizations have been completed equals the binary form of the decimal number.

12. In a decimal to binary radix converter, a binary accumulator having a plurality of cascaded binary stages one for each power of the binary base 2, a plurality of networks one for each power of the decimal base 10 with each network being interconnected with preselected ones of said stages and adapted to transmit input impulses thereto to enter the binary equivalent of that power of base 10 therein, and means for repetitively energizing all of said networks, in time sequence, with each network being energized a number of times corresponding to the decimal digit associated with that power to be converted, whereby the resulting binary sum standing in said accumulator equals the binary form of said decimal number.

13. In the apparatus of claim 12, said repetitive energizing means including a switching means adapted to be energized by a recurring pulse source and to selectively direct a preselected number of said recurring impulses to each of said networks in turn.

14. In a decimal to binary radix converter, a binary accumulator having a plurality of cascaded counting stages, one for each power of the binary base 2, a plurality of transmitting means, one for each power of the decimal base 10 with each transmitting means being interconnected with preselected ones of said stages and adapted to transmit input impulses thereto to enter the binary equivalent of that power of base 10 therein, means for repetitively energizing the lowest power transmitting means a number of instances corresponding to the decimal digit associated therewith to be translated, said means being operative after said lowest power energizations have been completed for energizing the second power transmitting means a number of instances corresponding to the decimal digit associated therewith to be translated, and thereafter being operative to energize said next-in-order higher power transmitting means a number of instances corresponding to the decimal digits associated with those powers with each transmitting means being energized in sequence after the preceding transmitter has completed its series of operations.

15. In a converter for translating a number in one radix into a second radix, a plurality of impulse transmission networks, one for each order of the number when expressed in the first radix, each said transmission network including a plurality of impulse input lines corresponding in number to one less than said first radix and a like plurality of output lines, each transmission network further including means interconnecting each said output line thereof to a different number of said impulse input lines equal to a different digit of said first radix, an impulse source connected to supply an impulse to each input line of each said impulse transmission network in sequence such that in each network each output line carries a different number of impulses equal to a different digit of the first radix, an order network for each of said impulse transmission networks with each said order network having an input line and a plurality of output lines and being adapted to simultaneously transmit over said output lines impulses representing the second radix form of a different order of the first radix, a summing device for receiving the impulses from all said order networks, and means interconnecting any one of the output lines of each impulse transmission network with the input line of the corresponding order network selectively in accordance with the digit of that order to be translated.

References Cited in the file of this patent

UNITED STATES PATENTS

| | | |
|---|---|---|
| 2,570,716 | Rochester | Oct. 9, 1951 |
| 2,635,809 | Camp | Apr. 21, 1953 |
| 2,657,856 | Edwards | Nov. 3, 1953 |
| 2,729,811 | Gloess | Jan. 3, 1956 |
| 2,808,984 | Marshall | Oct. 8, 1957 |

OTHER REFERENCES

Bird: Computing Machines, Input and Output, Electronic Engineering (British), October 1953, pp. 407 to 410.